US008832858B2

(12) United States Patent
Hill et al.

(10) Patent No.: US 8,832,858 B2
(45) Date of Patent: *Sep. 9, 2014

(54) ACCESS TO APPLICATION PROGRAMMING INTERFACE SYSTEMS AND METHODS

(71) Applicant: MasterCard International Incorporated, Purchase, NY (US)

(72) Inventors: Gregg Alan Hill, Lake Saint Louis, MO (US); Tamara Lynn Arrington, Wentzville, MO (US); Eric Ray Kitchen, O'Fallon, MO (US)

(73) Assignee: MasterCard International Incorporated, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/898,164

(22) Filed: May 20, 2013

(65) Prior Publication Data

US 2013/0269041 A1 Oct. 10, 2013

Related U.S. Application Data

(63) Continuation of application No. 12/986,610, filed on Jan. 7, 2011, now Pat. No. 8,458,808.

(51) Int. Cl.
| G06F 7/04 | (2006.01) |
| G06F 7/00 | (2006.01) |
| G06Q 10/00 | (2012.01) |
| G06F 21/31 | (2013.01) |
| G06Q 30/04 | (2012.01) |

(52) U.S. Cl.
CPC ............... *G06F 21/31* (2013.01); *G06Q 30/04* (2013.01)
USPC .................................. 726/28; 707/783; 705/5

(58) Field of Classification Search
None
See application file for complete search history.

(56) References Cited

U.S. PATENT DOCUMENTS

| 6,005,942 A | 12/1999 | Chan et al. |
| 6,481,632 B2 | 11/2002 | Wentker et al. |
| 6,560,581 B1 | 5/2003 | Fox et al. |
| 7,652,990 B2 | 1/2010 | Bryson |
| 2004/0139021 A1 | 7/2004 | Reed et al. |
| 2006/0195401 A1 | 8/2006 | Davis et al. |
| 2006/0242151 A1 | 10/2006 | Jogand-Coulomb et al. |
| 2009/0254482 A1 | 10/2009 | Vadlamani et al. |
| 2009/0327139 A1 | 12/2009 | Shah et al. |
| 2010/0100398 A1 | 4/2010 | Auker et al. |
| 2011/0154130 A1 | 6/2011 | Helander et al. |

OTHER PUBLICATIONS

International Search Report and Written Opinion for International Application No. PCT/US11/67189 mailed Feb. 21, 2012 (11 pgs).

*Primary Examiner* — Mussa A Shaawat
(74) *Attorney, Agent, or Firm* — Armstrong Teasdale LLP

(57) ABSTRACT

A method and system for granting premium access to a service application stored within a service provider (SP) computer system through an open API platform is provided. The method includes receiving a request for premium access to the service application from a developer of a developer application wherein the developer application is configured to request data from the service application, assigning a production key to the developer application, sending an electronic message to a service owner (SO) associated with the service application requesting premium access to the service application, granting premium access to the service application by the SO for the developer application, updating the production key at the open API platform to include premium access to the service application, and notifying the developer of the granting of the premium access to the service application for the developer application.

20 Claims, 9 Drawing Sheets

700 ⟶

Premium Services —702
Select one or more services that you would like to use with this production key.
- ☐ Locations
- ☐ Offers
- ☐ Payments

Free Services —704
Select one or more services that you would like to use with this production key.
- ☐ Locations
- ☐ Offers
- ☐ Payments

Certificate
In order to get an API Key, you need to supply a PEM encoded Certificate Request File.

Certificate Request File: [          ] ( Browse... )
706 ⟶

( Submit )　( Cancel )

Developer Premium Service Request Approval

Developer and Key Alias Request — 802
[ Select Developer and Key Alias ▽ ]

Name: First Last          Address: 1237 First Street
                                           Newport, VA
Email: Email@somewhere.com             United States

Phone: 555 123-7654       Company: Co Name

Key Alias Name:

Key Alias Description:

Approve or Deny Premium Access          Client ID
[ Approve ▽ ]                            [ Client ID ▽ ]
      —804                                      —806
Throttling Amount                        Throttling Time Period
[ Select Throttling Amt ▽ ]              [ 24 Hours ▽ ]
      —808                                      —810
Comments              —812

[                                                    ]

[ Submit ]

Monthly Billing Reports                    —814

January    February    March    April    May    June

FIG. 8

ACCESS TO APPLICATION PROGRAMMING INTERFACE SYSTEMS AND METHODS

CROSS REFERENCE TO RELATED APPLICATIONS

This application is a continuation and claims priority to U.S. patent application Ser. No. 12/986,610 filed Jan. 7, 2011 for "PREMIUM ACCESS TO OPEN APPLICATION PROGRAMMING INTERFACE SYSTEMS AND METHODS," which is hereby incorporated by reference herein in its entirety.

BACKGROUND OF THE INVENTION

This invention relates generally to providing access to a computer system through an open application programming interface (API) and, more particularly, to network-based methods and systems for providing developers of software applications premium access to a service provider computer system through an open API architecture.

There are service provider companies that provide a variety of services to numerous consumers. These service provider companies utilize computer systems to provide these services. For example, in the financial industry, companies such as large banks, interchange networks and payment networks provide certain financial services to consumers, companies and other banks. Oftentimes, these service provider companies provide services that include receiving, processing and storing financial data in computer systems managed by the service provider companies. In many cases, access to this financial data is restricted to certain approved users. Restricting access to such financial data provides at least some protection for the data. However, it also limits the potential uses of the data.

Software developers around the world are able to develop computer programs, sometimes called applications, that are configured to utilize data such as the data stored within computer systems used by certain service provider companies. Of course, in order for these computer programs to use such data, the developer programs must be able to access the data. One way to access the data stored by these service provider companies is through an open application programming interface (API).

By allowing software developers to access data stored within computer system used by these service provider companies, the service provider companies are able to leverage these developer applications as well as increase their transaction volume. Thus, by providing this data access to developers, these service provider companies are able to provide additional services to both existing and new customers, which in turn improves the profitability of these companies. However, the providing of such data access also creates certain risks and challenges for the service provider companies.

Accordingly, it would be desirable to provide a computer system having an open API that could be used by certain service provider companies, such as financial transaction companies, that is configured to: (i) provide secure access to data stored within the service provider computer systems; (ii) control access to said data; and (iii) manage the billing associated with providing said access.

BRIEF DESCRIPTION OF THE INVENTION

In one embodiment, a computer-based method for granting premium access to a service application stored within a service provider (SP) computer system through an open application programming interface (API) platform is provided. The method includes receiving a request for premium access to at least one service application from a developer of a developer application wherein the request is received at the open API platform and the developer application is configured to request data from the at least one service application, assigning a production key to the developer application, sending an electronic message to a service owner (SO) associated with the at least one requested service application requesting premium access to the at least one requested service application, granting premium access to the at least one requested service application by the SO for the developer application, updating the production key at the open API platform to include premium access to the at least one service application, and notifying the developer of the granting of the premium access to the at least one service application for the developer application.

In another embodiment, a computer system for granting premium access to a service application stored within a service owner (SO) computer device is provided. The SO computer device is associated with a SO. The computer system including a memory device for storing data, and a service provider (SP) computer system. The SP computer system includes a processor and an open application programming interface (API) platform. The SP computer system is in communication with the memory device and the SO computer device. The SP computer system is programmed to receive a request for premium access to the service application stored within the SO computer device from a developer of a developer application wherein the developer application is configured to request data from the service application, assign a production key to the developer application, send an electronic message requesting premium access to the service application, update the production key at the API platform to include premium access to the service application after the API platform receives notification from the SO computer device that the SO has granted premium access to the service application for the developer application, and notify the developer of the granting of the premium access to the service application for the developer application.

In another embodiment, a computer system for granting premium access to a service application is provided. The computer system includes a service owner (SO) computer device associated with a SO, a memory device for storing data, and a service provider (SP) computer device comprising a processor and an open application programming interface (API) platform. The SO computer device is configured to store the service application and grant premium access to the service application. The SP computer device is in communication with the memory device and the SO computer device. The SP computer device is configured to receive a request for premium access to the service application from a developer of a developer application wherein the developer application is configured to request data from the service application, receive a production key assigned to the developer application, send an electronic message to the SO computer device requesting premium access to the service application, update the production key at the API platform to include premium access to the service application after the SO grants premium access to the service application for the developer application, and notify the developer of the granting of the premium access to the service application for the developer application.

In another embodiment, one or more computer-readable non-transitory media comprising a computer-executable program that instructs at least one processor to provide premium access to a service application stored within a service provider (SP) computer system through an open application programming interface (API) platform is provided. The computer-executable program comprising at least one code segment that instructs the at least one processor to receive a request for premium access to the service application from a developer of a developer application wherein the request is received using the open API platform and the developer application is configured to request data from the service application, receive a production key assigned to the developer application, send an electronic message to a service owner (SO) associated with the service application requesting premium access to the service application, grant premium access to the service application for the developer application, update the production key at the open API platform to include premium access to the service application, and notify the developer of the granting of the premium access to the service application for the developer application.

BRIEF DESCRIPTION OF THE DRAWINGS

FIGS. 1-8 show exemplary embodiments of the methods and systems described herein.

FIG. 1 is a simplified block diagram of an exemplary service system including a plurality of computer devices in accordance with one embodiment of the present invention.

FIG. 2 is an expanded block diagram of an exemplary embodiment of a server architecture of the service system including the plurality of computer devices in accordance with one embodiment of the present invention.

FIG. 3 is a block diagram of an exemplary embodiment of a user computer device as shown in FIGS. 1 and 2.

FIG. 4 is a block diagram of an exemplary embodiment of a server computer device as shown in FIGS. 1 and 2.

FIG. 5 is a more detailed block diagram of an exemplary configuration of the service provider computer system in communication with other computer devices as shown in FIGS. 1 and 2.

FIG. 7 is an exemplary production key request user interface for requesting premium access to the service provider computer system shown in FIG. 5.

FIG. 8 is an exemplary premium service request approval user interface for approving a premium access request by a service owner computer device shown in FIG. 5.

DETAILED DESCRIPTION OF THE INVENTION

Figure 1:
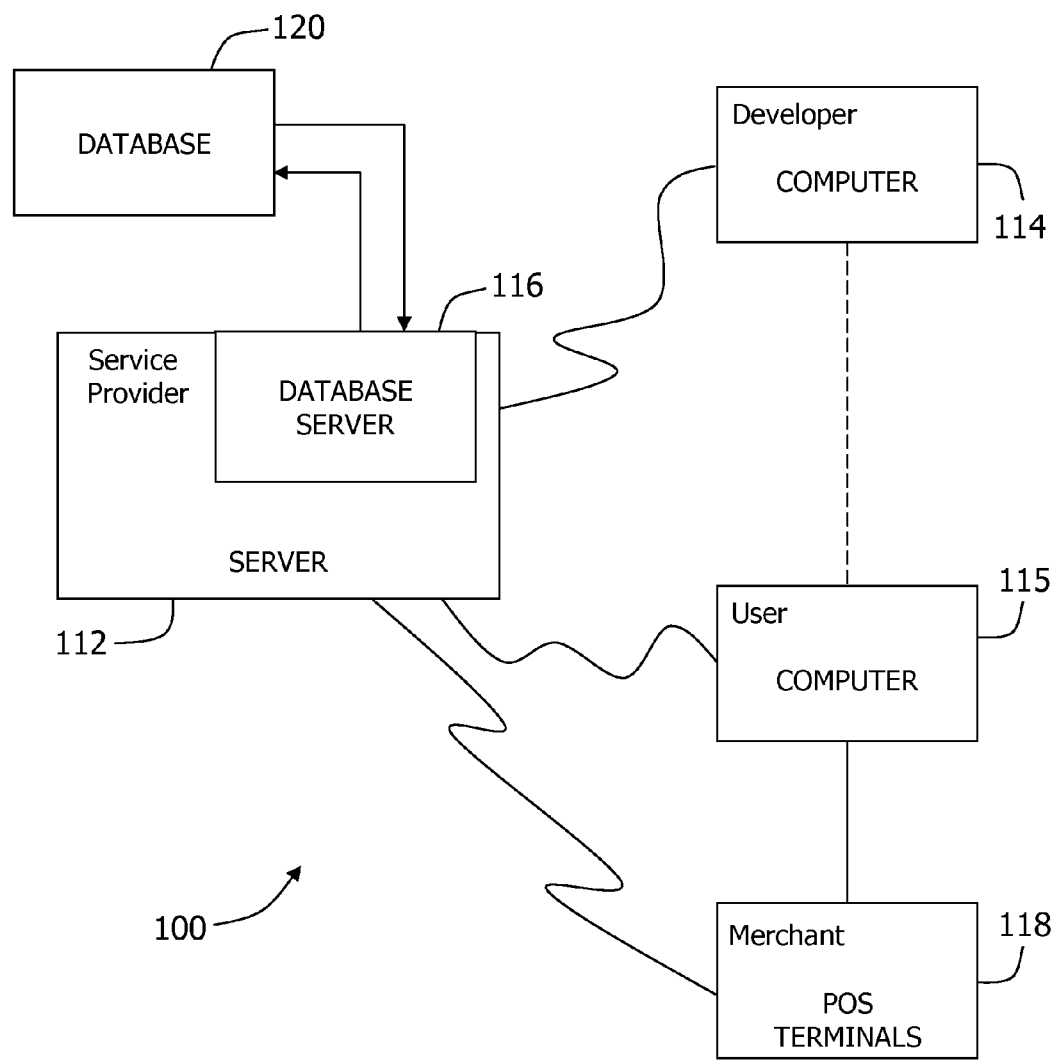

Embodiments of the methods and systems described herein enable a service provider company associated with a service provider computer system, which includes service applications stored therein, to offer premium access to the service applications for use by developers of computer software applications. The developers access the service applications stored within the service provider (SP) computer system through a developer portal and an application programming interface (API) platform. The service applications are stored within service owner (SO) computer devices, which are included with the SP computer system.

The developers use data from the service applications in response to executing a developer application. A developer uses a developer computer system to send a request for premium access to a selected service application stored within the SP computer system by accessing the developer portal, and the API platform receives and forwards the developer request for premium access to the SO of the selected service application, who in turn approves or denies the developer request. Each SO being an owner of a particular service or set of services included within the overall SP computer system.

In the example embodiment, the service provider computer system is a financial service computer system that provides financial transaction services to developers, consumers, merchants, acquirers and/or issuers. The services may include providing data representing financial transactions, processing payment card transactions, locating banks or ATMs, providing information such as discounts and offers, etc.

After the SO approves the developer request for premium access, the SO sets a throttling amount and throttling time period, and enters a client ID (which is assigned by the API platform) to the developer application to be passed in messages for service enforcement. After being notified of the granting of premium access, the developer executes the developer application at the developer computer device which sends a message to the API platform. The API platform validates the developer application message, and checks the throttling limit assigned to the developer application before forwarding the developer application message to the proper service application. The service application applies premium access rules to the developer application message, returns a number of records in response to the applied rules, and sends a service response to the API platform for forwarding to the developer computer device. The developer application receives the service response, and displays or uses the results. The premium access rules are based on the premium access granted to the developer application, which means the rules may be applied to additional data, with increased speed, with an improved priority, to additional services, and may include individualized billing programs as compared to general access to the service application.

In the example embodiment, the developer application can also be executed by a computer system associated with at least one of a consumer, a merchant, an acquirer, a processor and an issuer (collectively used herein as a "user"). In other words, in some cases, a user can download the developer application from the developer computer system for execution by the user computer device. In this embodiment, the user computer sends a developer application message to the API platform. The API platform validates the developer application message, and checks the throttling limit assigned to the developer application before forwarding the developer application message to the proper service application. The service application applies rules (premium access rules) to the developer application message, returns a number of records in response to the applied rules, and sends a service response to the API platform for forwarding to the user computer device. The developer application receives the service response, and displays the results or uses the results at the user computer system.

As described herein "premium access" refers to access granted to a developer or a developer application for accessing service applications stored on SO computer devices within the SP computer system. Premium access can be granted on a developer basis or on a developer application basis. Premium access is improved or superior access to data stored within the SO computer devices as compared to general access to the SO computer devices. Premium access, as used herein, is defined to include access to additional data, additional bandwidth (i.e., data provided faster), improved data receiving priority, additional services, and individualized billing programs for the services provides as compared to general access to the SO computer devices.

In the example embodiment, the API platform enables an SO to offer both general access and premium access to developers. SOs desire the ability to offer a controlled access or "premium access" of their services to developers and business partners, in addition to the general access or open access. Premium and general access may be service-specific. For example, a developer may have an application with general access to Service A, and premium access to Service B.

In the methods and systems described herein, general access and premium access for each service may be optional. For example, it is possible that at least some services may have general access, and some may have premium access as well. Services with general access will provide that access to all developers and will provide standard data throughput and access to all non-restricted data, resources, and functions. Premium access is defined as greater data throughput, access to restricted data, access to restricted resources and restricted functions. Throughput is defined as one or both of the following: (a) number of requests (calls) allowed in a given time frame, and (b) number of records returned for a given request.

In the example embodiment, the SO will have the ability to define general access for their respective services, and will have the ability to define premium access for their respective services. The SO will also be able to define a premium access fee structure for their respective services. In the example embodiment, the SO may negotiate premium access online with a developer or may negotiate premium access to services through more traditional channels.

In the methods and systems described herein the API platform is configured to provide developer usage data to the SP/SO to support invoicing and fee collection for premium access. The API platform is also configured to enable the SO to grant and revoke premium access at any time.

The following detailed description illustrates embodiments of the invention by way of example and not by way of limitation. It is contemplated that the invention has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effects may include at least one of: a) a developer requests a production key with premium access to a service application stored within a service provider (SP) computer system, wherein the developer submits the request from a developer computer system through a developer portal to the SP computer system; b) an API platform receives the developer request for premium access, signs the production key granting general access to any requested service application with general access, and sends an email to an SO associated with the requested service application, wherein the email is sent to an SO computer device included within the SP computer system and the email requests premium access to the requested service application for the developer; c) the SO logs into the SO application requested by the developer, and either approves or denies the developer request for premium access; d) after the SO approves the developer request, then the SO is prompted to select a throttling amount and throttling time period, and gets the client ID to the developer application to be passed in messages for service enforcement; e) the API platform updates the production key to include access to the approved premium service; f) the developer is notified of the granting of premium access; g) the developer or a user executes the developer application having premium access such that the developer application sends a message to the API platform, wherein the developer application message includes the client ID and the production key provided by the SO; h) the API platform validates the developer application message by verifying the client ID and production key, and, after validation, checks the throttling limit assigned to the developer application; i) the API platform then forwards the developer application message through an API services wrapper or directly to the corresponding service application at the SO computer system; j) the corresponding service application applies premium access rules to the developer application message, returns a number of records in response to the applied rules, and sends a service response having a bill code to the API platform; k) the API platform stores a message history of the service response with the bill code, removes the bill code from the service response, and sends the response to the developer computer device (if the developer sent the developer application message) or to the user computer device (if a consumer, merchant, acquirer and/or issuer sent the developer application message); and l) the developer application receives the service response, and displays or uses the results.

In the financial transaction service system described herein the bill code enables the SO to create a billing report for the developer. The SO requests a billing report from the API platform for a specific time period, and the API platform builds the report based on the bill code. The API platform stores the billing report in the database in a location designated by the SO. The SO is then able to bill the developer for using the SO service application. In the example embodiment, the SO and the developer are able to negotiate and enter into a customized or individualized billing program for providing premium access to the service application. These billing programs are typically based at least in part on a number of application request messages submitted to the service application by the developer application during a predefined period of time.

FIG. 1 is a simplified block diagram of an exemplary service system 100 including a plurality of computer devices in accordance with one embodiment of the present invention. System 100 includes a service provider system (e.g., financial services provider) that allows developers of computer applications to access a variety of service applications hosted by the service provider (SP) computer system such that the developer applications can utilize data stored within the SP computer system. The developer applications can be utilized by the developer via a developer computer system or can be offered to a consumer, a merchant, an acquirer or an issuer (collectively a "user") for use by the users via user computer systems.

More specifically, in the example embodiment, system 100 includes a server system 112, which is a type of computer system, and a plurality of client sub-systems (also referred to as client systems 114 and 115) connected to server system 112. In one embodiment, client systems 114, 115 are computers including a web browser, such that server system 112 is accessible to client systems 114, 115 using the Internet. Client systems 114, 115 are interconnected to the Internet through many interfaces including a network, such as a local area network (LAN) or a wide area network (WAN), dial-in-connections, cable modems, and special high-speed ISDN lines. Client systems 114, 115 could be any device capable of interconnecting to the Internet including a web-based phone, personal digital assistant (PDA), or other web-based connectable equipment.

System 100 also includes point-of-sale (POS) terminals 118, which may be connected to client systems 114, 115 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114, 115 by logging onto server system 112 through one of client systems 114, 115. In an alternative embodiment, database 120 is stored remotely from server system 112 and may be non-centralized.

Database 120 may store transaction data generated as part of sales activities conducted over the services network including data relating to merchants, account holders or customers, developers, issuers, acquirers, purchases made, and services provided by system 100. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data.

In the example embodiment, client system 114 may be associated with a developer of computer applications and may be referred to as a developer computer device, and client system 115 may be associated with a consumer, an acquirer or an issuer and may be referred to as a user computer device. Developer computer device 114 stores developer applications that a user may access and utilize via user computer device 115. Server system 112 may be associated with a service provider (SP) and maybe referred to as a SP computer device. In the example embodiment, an SP may include a payment network provider, an interchange network provider, or any other provider of financial services.

In the embodiment where the SP is an interchange network provider, system 100 includes POS terminals 118, which may be associated with a merchant. In this embodiment, system 100 may be part of a multi-party payment card industry system for enabling ordinary payment-by-card transactions such as a credit card payment system using the MasterCard® interchange. The MasterCard® interchange is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

For example, in a typical payment card system, a financial institution called the "issuer" issues a payment card, such as a credit card, to a consumer, who uses the payment card to tender payment for a purchase from a merchant. To accept payment with the payment card, the merchant must normally establish an account with a financial institution that is part of the financial payment system. This financial institution is usually called the "merchant bank" or the "acquiring bank" or "acquirer bank." When a consumer tenders payment for a purchase with a payment card (also known as a financial transaction card), the merchant requests authorization from the merchant bank for the amount of the purchase. The request may be performed over the telephone, but is usually performed through the use of a point-of-sale terminal, which reads the consumer's account information from the magnetic stripe on the payment card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor."

Using the interchange network, the computers of the merchant bank or the merchant processor will communicate with the computers of the issuer bank to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

The financial transaction cards or payment cards discussed herein may include credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Although the SP has been described herein as an interchange network provider, it does not have to be so limited. As indicated above, the SP may also be a payment network provider or any other provider of financial services. In these embodiments, a transaction card, a payment or even a purchase are not necessarily needed to utilize the services provided by the SP.

Figure 2:
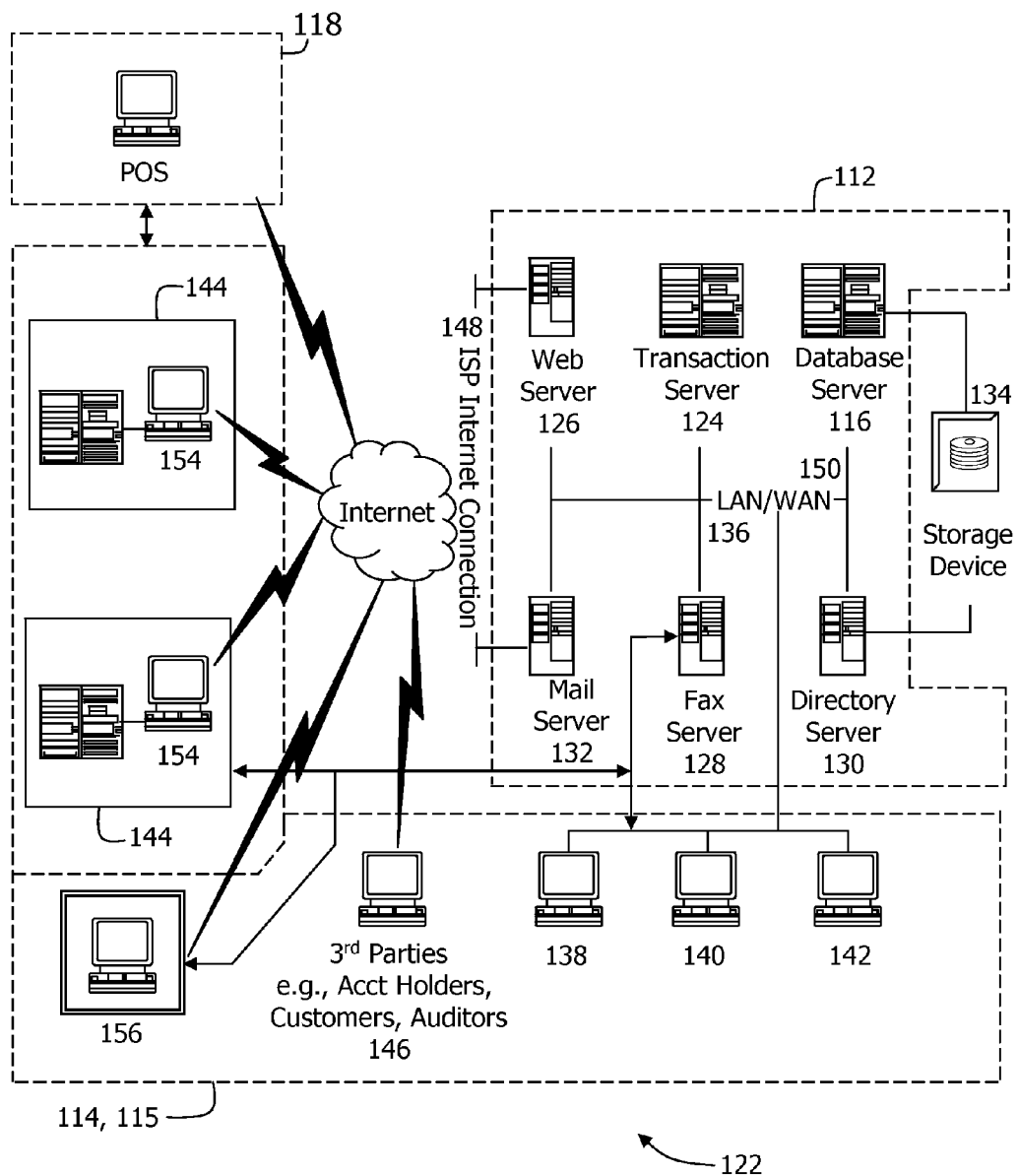

FIG. 2 is an expanded block diagram of an exemplary embodiment of a server architecture of a service system 122 including other computer devices in accordance with one embodiment of the present invention. Components in system 122, identical to components of system 100 (shown in FIG. 1), are identified in FIG. 2 using the same reference numerals as used in FIG. 1. System 122 includes server system 112, client systems 114 and 115, and POS terminals 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 3:
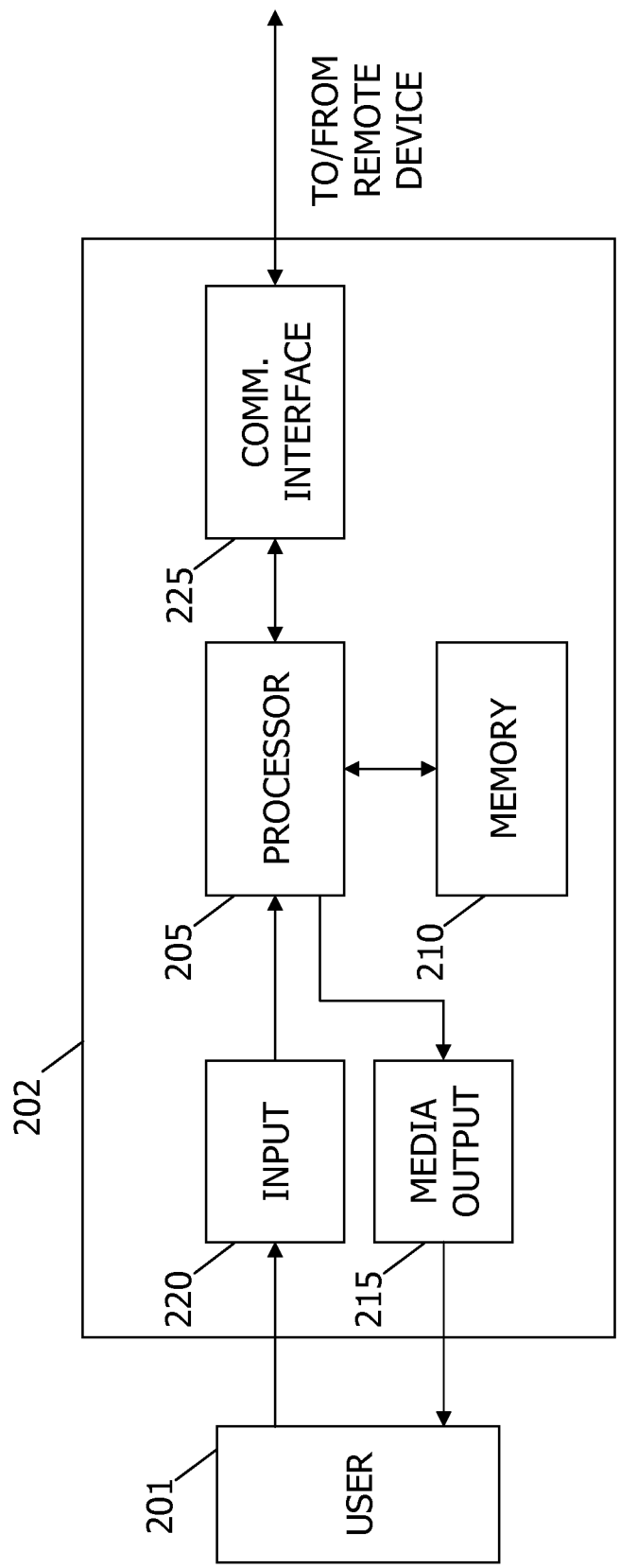

FIG. 3 illustrates an exemplary configuration of a user computer device 202 operated by a user 201. User computer device 202 may include, but is not limited to, client systems 114, 115, 138, 140, and 142, 146, POS terminal 118, workstation 154, and manager workstation 156 (shown in FIG. 2).

User computer device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer readable media.

User computer device 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, user computer device 202 includes an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

User computer device 202 may also include a communication interface 225, which is communicatively couplable to a remote device such as server system 112. Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 4:
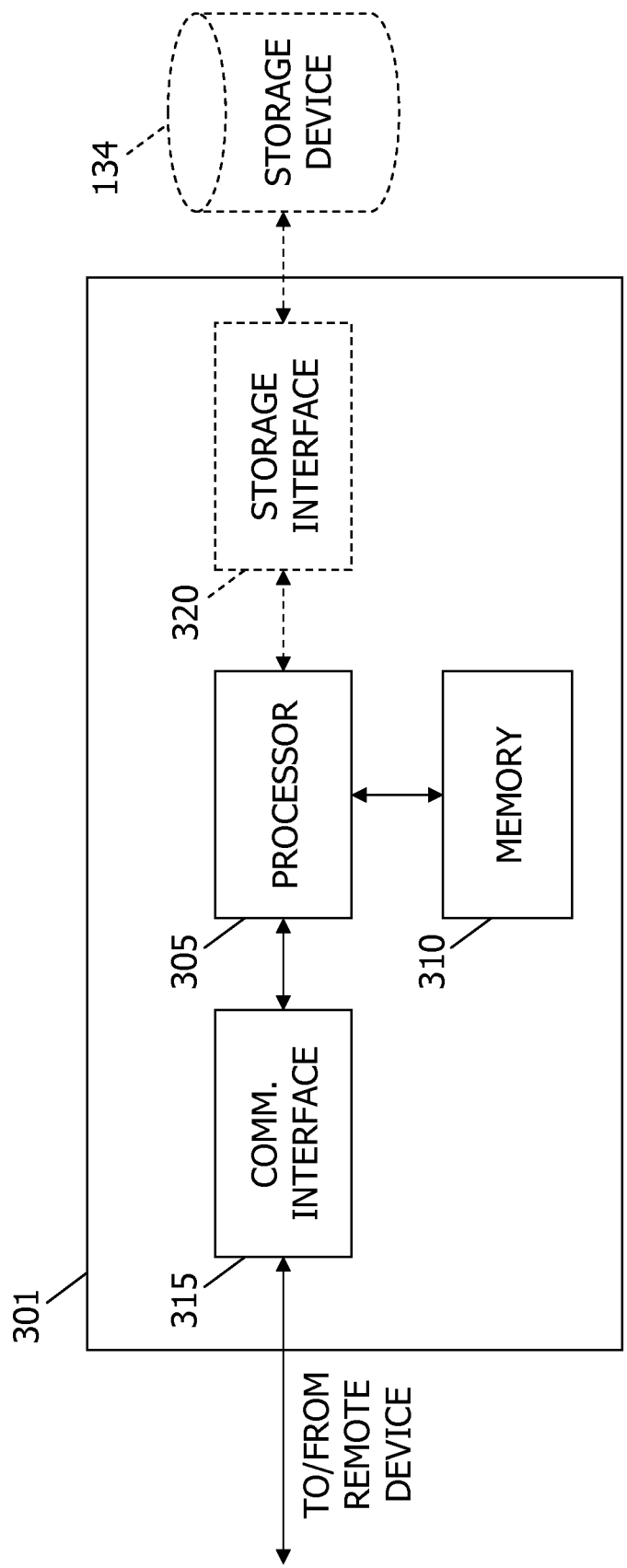

FIG. 4 illustrates an exemplary configuration of a server computer device 301 such as server system 112 (shown in FIGS. 1 and 2). Server computer device 301 may include, but is not limited to, database server 116, transaction server 124, web server 126, fax server 128, directory server 130, and mail server 132.

Server computer device 301 includes a processor 305 for executing instructions. Instructions may be stored in a memory area 310, for example. Processor 305 may include one or more processing units (e.g., in a multi-core configuration).

Processor 305 is operatively coupled to a communication interface 315 such that server computer device 301 is capable of communicating with a remote device such as user computer device 202 or another server computer device 301. For example, communication interface 315 may receive requests from user computer device 114, 115 via the Internet, as illustrated in FIGS. 1 and 2.

Processor 305 may also be operatively coupled to a storage device 134. Storage device 134 is any computer-operated hardware suitable for storing and/or retrieving data. In some embodiments, storage device 134 is integrated in server computer device 301. For example, server computer device 301 may include one or more hard disk drives as storage device 134. In other embodiments, storage device 134 is external to server computer device 301 and may be accessed by a plurality of server computer devices 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory areas 210 and 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
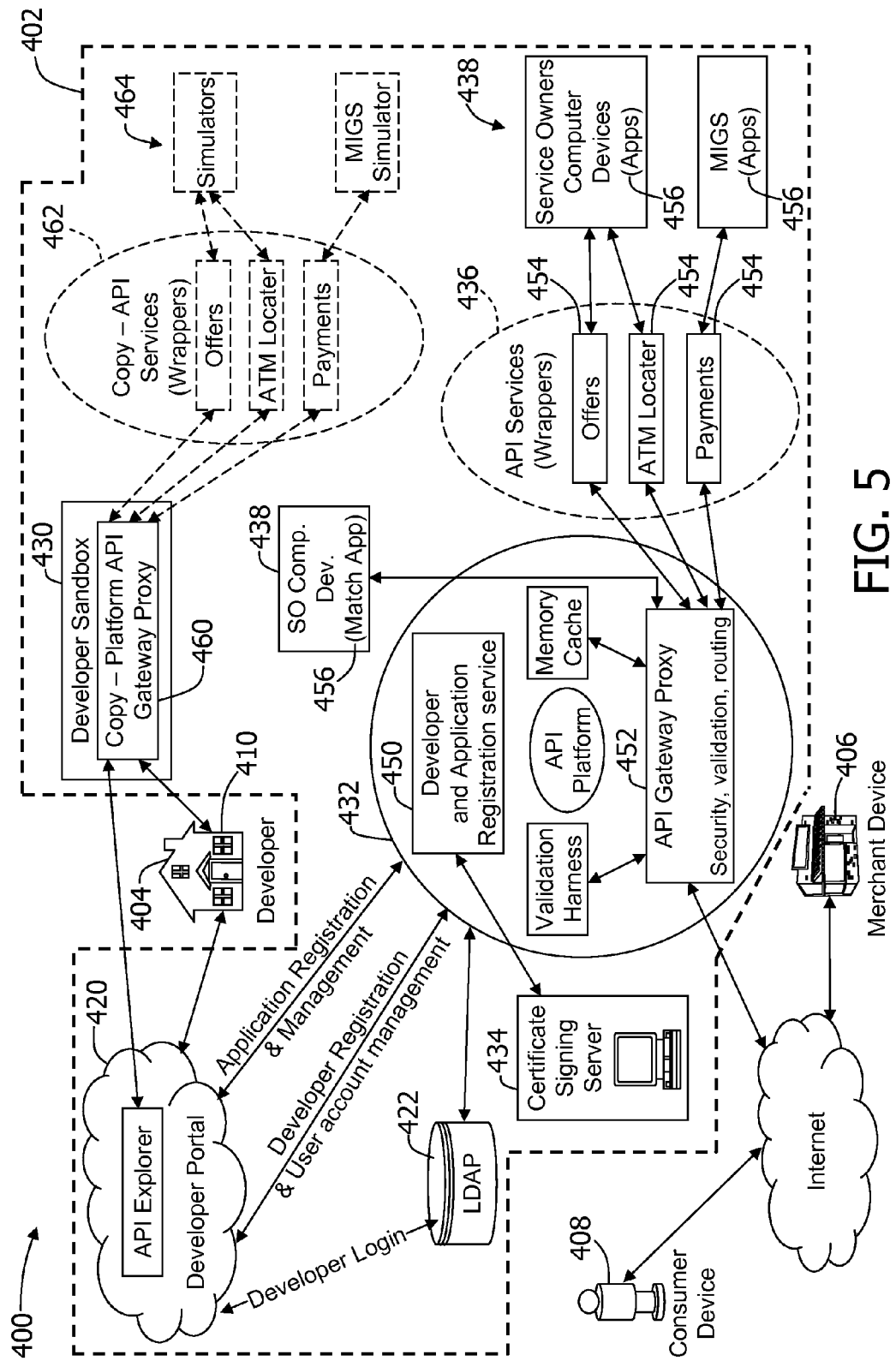

FIG. 5 illustrates an exemplary configuration of a service system 400 in accordance with the present invention. System 400 is similar to systems 100 and 122 (shown in FIGS. 1 and 2). In the example embodiment, system 400 includes a service provider computer system 402 such as SP server system 112 (shown in FIGS. 1 and 2), a developer computer device 404 such as developer computer device 114 (shown in FIGS. 1 and 2), a merchant computer device 406 such as user computer device 115 (shown in FIGS. 1 and 2), and a consumer computer device 408 such as user computer device 115 (shown in FIGS. 1 and 2).

Developer computer device 404 includes a processor for executing instructions. Instructions may be stored in a memory area. The memory area may also include one or more developer applications 410. Applications 410 include computer-implemented instructions that cause a computer device to interact with another computer device. For example, a developer may create an application 410 for locating ATMs included within a network of ATMs serviced by the SP (referred to as the "ATM Locator App"). The ATM Locator App can be stored within the memory area for use by computer device 404. Developer computer device 404 is in communication with SP computer system 402 through a developer portal 420, and through a developer sandbox platform 430. As explained below in greater detail, sandbox platform 430 is a test platform provided by SP computer system 402 that enables a developer to test its applications with test data before such applications are rolled out for processing live production data.

SP computer system 402 includes API portal 420, memory device 422, sandbox platform 430, API platform 432, certificate signing server 434, API services wrapper 436, and SO computer systems 438.

API portal 420 is configured to communicate with developer computer device 404, and facilitates managing developer registration and login with system 402. API portal 420 also enables developer computer device 404 to communicate with API platform 432. API portal 420 communicates with memory device 422 to facilitate a login by a developer.

API platform 432 includes a registration service 450 that is used to register developers and developer applications 410 with SP computer system 402. Registration service 450 is in communication with certificate signing server 434. API platform 432 also includes an API gateway proxy 452.

API platform 432 is in communication with API services wrapper 436. API services wrapper 436 includes wrappers 454 for each service application 456 provided by an SO within SP computer system 402. Service applications 456 are stored at SO computer systems 438. SO computer systems 438 are in communication with API platform 432 through API services wrapper 436 or may be connected directly with API platform 432 without a wrapper.

Continuing with the ATM Locator App example from above, SO computer devices 438 may include a service application 456 that includes data showing a location of each of the ATM machines included within the network serviced by the SP (referred to as the "ATM Locator Service"). In this example, the ATM Locator App, which is stored on developer computer device 404, is able to communicate with SO computer device 438 through API platform 432 and API services wrapper 436 by developer computer device 404 sending a data request to SO computer device 438, and by receiving a data response back from SO computer device 438. Developer computer device 404 is then able to display the location of all the ATMs within the SP network or at least some of the ATMs within the network.

Merchant computer device 406 and consumer computer device 408 each include a processor for executing instructions. Instructions may be stored in a memory area. The memory area may also include one or more developer applications 410 downloaded from developer computer device 404 for use by the merchant, consumer, acquirer, and/or issuer (collectively a "user"). In other words, a developer may develop an application that can be used by a user on their computer devices (e.g., a POS device, a personal computer, smart phone or PDA). The user downloads the application from the developer to their computer device for use by the user. When the user uses developer application 410, merchant and/or consumer computer devices 406, 408 communicate with SP computer system 402 through API platform 432. Continuing with the ATM Locator App example from above, the user can download the ATM Locator App from developer computer device 404. Consumer computer device 408 is then able to communicate with SO computer devices 438 through API platform 432 and API services wrapper 436 by sending a data request to SO computer devices 438, and by receiving a data response back from SO computer devices 438. Consumer computer device 408 is then able to display the location of all the ATMs within the SP network or at least some of the ATMs with the network.

As discussed above, SP computer system 402 includes a developer sandbox platform 430, which enables a developer to test its applications with test data before such applications are rolled out for processing live production data. Sandbox platform 430 includes a copy 460 of API gateway proxy 452, a copy 462 of API services wrapper 436, and simulator computer devices 464 which are configured to simulate SO computer devices 438. Sandbox platform 430 includes test data that allows a developer to test its applications 410 prior to rolling out applications 410 for production use.

In the example embodiment, a developer visits a web portal, referred to as API portal 420, designed specifically for SP computer system 402. At the home page, developers will be prompted to register with API platform 432. The registration process will collect, and authenticate as required, the following data elements from the developer: first name, last name, username, password, email address, country, street address, city, state/province, postal code, phone number, and company/university affiliation. Additionally, as a condition of registration, developers must opt-in to the program by affirmatively consenting to the terms and conditions and privacy notice. API portal 420 also includes a mechanism for the developers to request access to their information in the event that they desire to change, modify or delete such information.

Once registered and authenticated, developers can log into API portal 420 and access a variety of information regarding the various service applications 456 (e.g., service offerings such as payments, locators, offers, MATCH, etc.). Each service application 456 will have its own page(s) dedicated to describing the business requirements and specifications for that service in a format easily understood by non-industry developers.

Additionally, the developers will be able to log into API portal 420, register a key alias and request a sandbox key. The sandbox key allows developer's applications to access sandbox platform 430, which is an environment where developers can test and validate messages using service simulators 464.

Once a developer has been given a sandbox key, the developer can return to API portal 420 at any time and request a production key. A production key and client ID will be issued for the key alias used by the developer in the developer application. The client ID will identify which key alias is using API platform 432 to process messages and the developer that owns the production key. In the example embodiment, sandbox and production keys are not intended to be transferable or shared.

For every message that API platform 432 processes, the following will be logged: message request type; date and time received; path (message URL); IP address of sender; user agent of sender (name of sending application like IE, Firefox, or a different name); process time; and success or fail. If fail then, error information; client ID; key alias; user ID (system generated ID for developer account that owns the client ID); and unique message ID. There may be additional data elements collected based on the differing requirements of the various API service offerings. For example: for payments that have a merchant, a merchant ID will be logged in addition to the elements listed above.

In the example embodiment, a developer is required to register with SP computer system 402 to access certain information. However, an unregistered developer is able to access some information within SP computer system 402. For example, an unregistered developer can: review available API information, documentation and sample code; access certain functions; and access community pages and read forums. However, an unregistered developer cannot: post forum comments or blogs; create a key alias; or request a sandbox or production key.

API portal 420 provides a mechanism for developers to learn about the services that are available. They have the ability to: register; communicate with other developers via the forums; request keys for sandbox (testing) and production environments; view their personal dashboard; and view metrics on transactions for each key alias they have created. The keys provide message security between the developers and SP computer system 402.

SP computer system 402 allows a developer to interact with API sandbox platform 430. The developer uses sandbox platform 430 for testing and validating applications 410 by using simulators 464. The messages sent by developer applications 410 to API gateway proxy copy 460 are verified with a key. The key verifies that the message was not tampered with between the sender and SP computer system 402. The transaction in the message is authenticated by the backend simulator computer devices 464. The following data elements are collected from the developer during the sandbox key request process: (1) Key Alias: This is the alias the developer assigns to the key. It is used to present a user friendly identifier of the key on the dashboard. The dashboard is a web page on the portal website with the purpose of automatically displaying important information, objects, etc. (2) Description: The description of the key. It is assigned by the developer. Used on the dashboard to present the developer with a description of the key. (3) Use: This identifies if the key is for personal or commercial use. Personal use is an individual that intents to personally use or give to others for their personal use without charge. Commercial use is an individual that is developing for use by their employer or an individual that intends to sell their application to others. (4) Notes: This is free form notes that the developer can associate with the key. (5) Calls: This is the expected number of calls using the production key. It is assigned by the developer. Used by the SP for capacity planning (6) Profitable: This identifies if the developer intends the key to be used to generate a profit. It is assigned by the developer. (7) Certificate: The SP signs the certificate and makes it available to the developer on the dashboard to download. The developer sandbox key is valid for testing all available API service applications with general access and any premium services that the developer, key alias and client ID have an approved production key.

SP computer system 402 assigns a production key to a developer. During this phase, the developer will be assigned a production key number and that key number will be provided to SP computer system 402 during each call. SP computer system 402 will use the production key number to control access and track developer activity throughout the process. In the example embodiment, an existing key alias and sandbox key are required prior to requesting a production key. The following data elements are collected from the developer during the production key request process: (1) Certificate: SP computer system 402 signs the certificate and makes it available to the developer on the dashboard to download. (2) Production Services Requested: This is a request for which services the production key will be valid.

A developer is able to engage a customer of the SP. The developer can build applications 410 for any of SP's business partners, including merchants, issuers, acquirers, or any other party in the SP network. The following examples describe a developer building a developer application 410 for a merchant user (the user could also be an individual, an acquirer, a processor or an issuer). The developer may be working directly for a merchant or for themselves to sell their application 410 to a merchant. The roles of the developer and merchant are separate. The SP does not have to be part of the relationship between the developer and the merchant. In some embodiments, the merchant may be required to have a relationship with the service application 456 being used, e.g. MiGS (MasterCard Internet Gateway System). The merchant and merchant acquirer would need to be registered with MiGS and have the credentials to prove that relationship is valid prior to using API platform 432.

In the example embodiment, the SP has a trust relationship with an existing merchant. The messages sent by merchant computer device 406 using developer application 410 to API gateway proxy 452 are verified with a key (public and private key). The key verifies that the message was not tampered with between the sender and API platform 432. The transaction in the message is authenticated by the backend service application 456. During this phase, customer authentication is managed by the SO of service application 456 being called.

In the example embodiment, SP computer system 402 includes a certificate signing request (CSR) and a key generation process. This process is started by the developer after registration on API portal 420. The keys/certificates are generated by the developer outside of SP computer system 402 with open source tools (like Open SSL). The SP does not own the developer's private or public key. A developer could theoretically use the same key with multiple open API's or programs not just the open API of the SP. The developer owns their private key, public key and CSR (Certificate Signature Request). The basic steps in the process are as follows: (1) the developer uses an open source tool and requests a CSR; (2) the tool provides a private and public key pair, and the public key is included in the CSR; (3) the developer uploads the CSR which contains the public key to API platform 432; (4) API platform 432 assigns a client ID and signs the developer's public key, wherein the combination of the client ID and the signed developer's public key comprises the production key; (5) the developer then uses the client ID (which is included in the production key) in each message sent to API platform 432 that is digitally signed with the private key on developer's computer device 404; (6) API platform 432 uses the client ID to identify which public key to use to verify the private key used to sign the message. Tools used to create keys and a CSR typically ask the developer to enter the following information when creating a CSR and key pair: name, organization, organizational unit, city, state or province, and country.

Figure 6A:
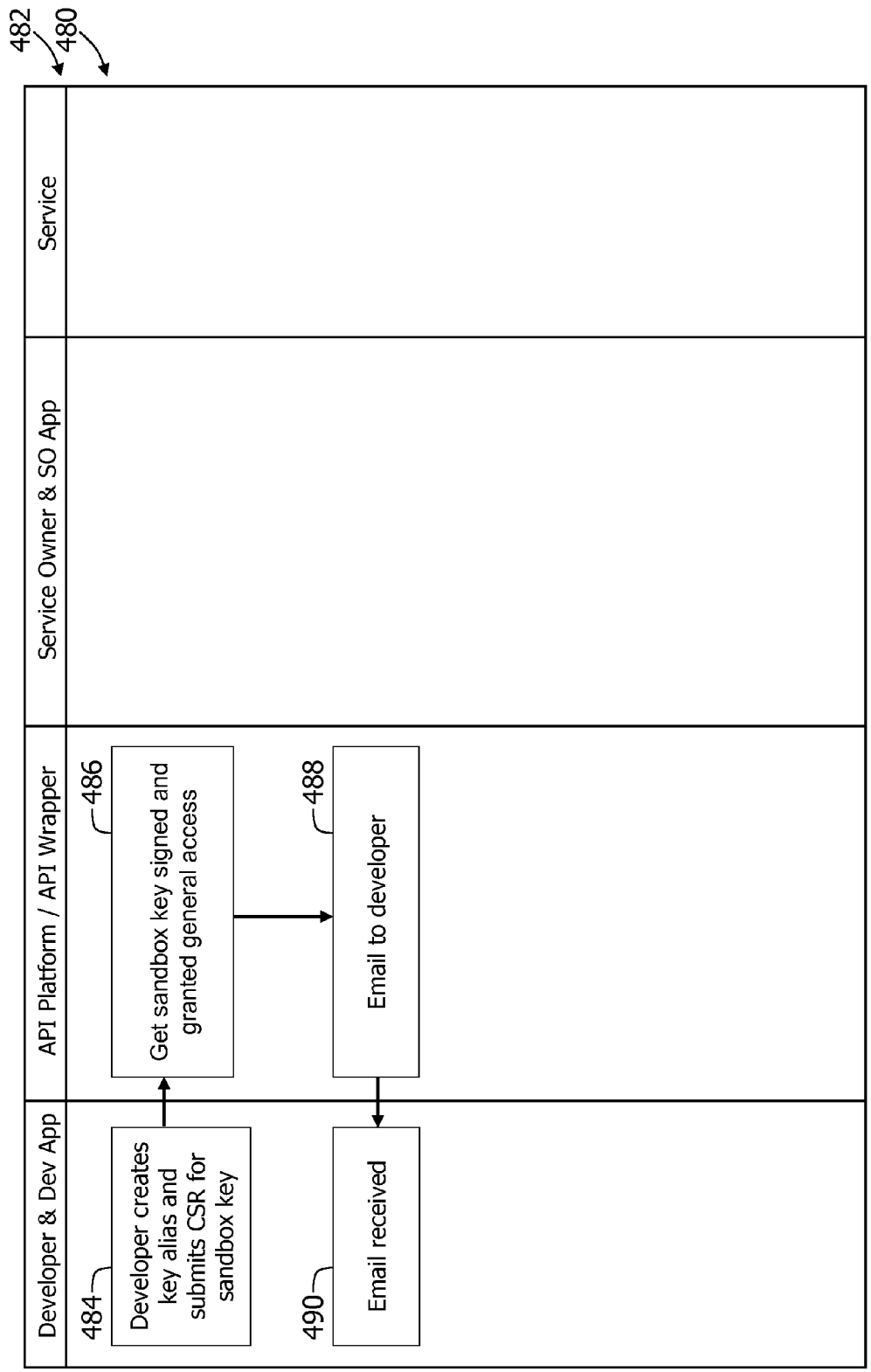
FIGS. 6A and 6B are data flow charts showing an exemplary process of providing premium access to the service provider computer system shown in FIG. 5 using an open API.

FIG. 6A is a data flow chart showing a first portion 480 of an exemplary process 482 of providing premium access to a service provider computer system such as computer system 402 (shown in FIG. 5). Components shown in FIG. 6A that are identical to components shown in FIG. 5 are labeled with the same reference numbers used in FIG. 5. Process 482 is implemented using SP computer system 402, developer computer device 404, merchant computer device 406, and consumer computer device 408.

First portion 480 of process 482 includes a developer creating 484 a key alias and submitting a CSR (certificate signing request) for a sandbox key. Developer computer device 404 submits the CSR to sandbox platform 430. Sandbox platform 430 signs 486 the sandbox key and grants general access to the requested simulated service application stored on simulator computer devices 464. Sandbox platform 430 sends 488 an email to developer confirming the issuance of the sandbox key and general access being granted. Developer computer device 404 receives 490 the email from sandbox platform 430.

Figure 6B:
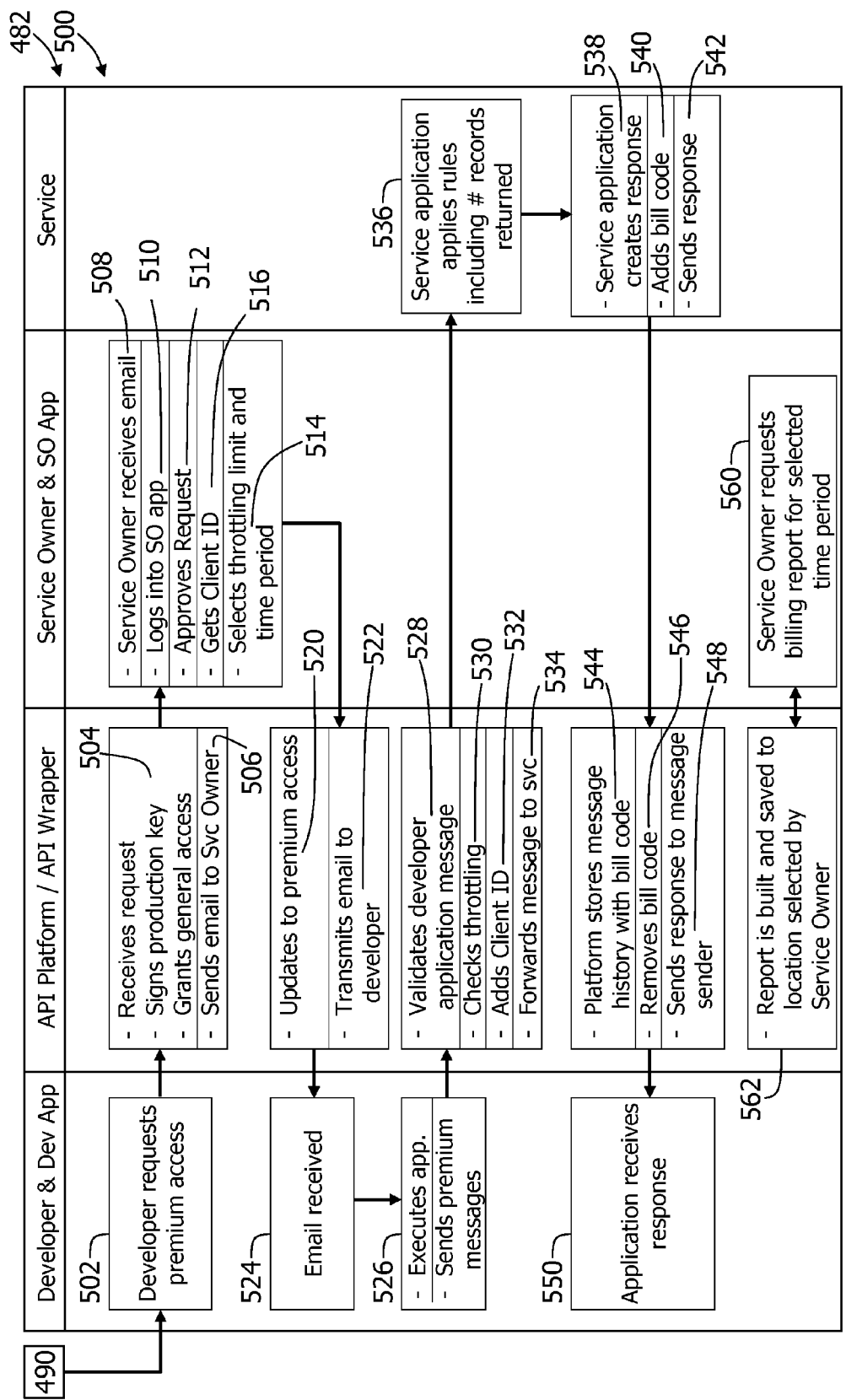

First portion 480 of process 482 then continues on to a second portion 500 of process 482 shown in FIG. 6B.

FIG. 6B is a data flow chart showing a second portion 500 of exemplary process 482 of providing premium access to a service provider computer system such as computer system 402 (shown in FIG. 5). Components shown in FIG. 6B that are identical to components shown in FIG. 5 are labeled with the same reference numbers used in FIG. 5. Second portion 500 of process 482 is implemented using SP computer system 402, developer computer device 404, merchant computer device 406, and consumer computer device 408.

Second portion 500 of process 482 includes a developer requesting 502 premium access including a production key to a particular service application 456 (the "first service application") stored on SO computer system 438. The developer request is submitted through developer portal 420, which is accessed via developer computer device 404. Portal 420 displays a user interface that prompts the developer to request a service application 456, such as first service application, offered by the SO via SO computer devices 438. Each key alias has a client ID, which enables developer computer system 404 to access the specific service application offered by the SO on SO computer device 438 through API platform 432 if the client ID has been approved by the SO.

API platform 432 receives 504 the developer request for premium access, signs the production key and grants general access to the developer for the first service application. API sends 506 an email to SO computer devices 438 requesting premium access to the first service application for the developer. A production key is only granted general access if a general service has been requested. If a premium service is requested that has a general service also then the general service will be granted. For example: if Locations Service Application has a general service and a premium service, and the developer requests the premium service then the general service will be granted immediately. If the developer requests MATCH Service Application which has premium service only then the client ID will not be granted any service access until the request is approved.

SO computer devices 438 receives 508 the email from API platform 432 and API services wrapper 436. The SO logs 510 into the SO application requested by the developer using SO computer devices 438. The production key request user interface is displayed on SO computer device 438 including the additional data fields designated for input by the SO. The SO selects the developer and key alias from a dropdown box, and selects 512 decline or approve for granting premium access to the first service application. If the SO selects decline, then a text box is provided for an explanation which can be emailed to the developer. If the SO selects approve, then the SO is prompted to select 514 a throttling amount and throttling time period, and gets 516 client ID already assigned to the developer to be passed in messages for service enforcement. The SO is provided the client ID so they can set up their service to handle requests from the specific approved source.

The production key for the developer is updated 520 from general access to premium access, and an email is transmitted 522 to notify the developer of the change in access to the requested service application. The email notifying the developer of the change in access is transmitted through API platform 432 to developer computer device 404.

The developer receives 524 the email at developer computer device 404 and updates its records to reflect premium access being granted to the requested service application. The developer executes 526 the developer application at developer computer device 404. The developer application sends a premium message to API platform 432. The developer premium application message includes the client ID and the production key provided by the API platform. API platform 432 validates 528 the developer premium application message by verifying the client ID and production key. After validation 528, API platform 432 checks 530 the throttling limit assigned to the developer application, captures the client ID from the message, and adds 532 the client ID to a header of the message. API platform 432 and API services wrapper 436 forward 534 the developer premium application message to the corresponding service application, the first service application.

The first service application applies 536 premium access rules to the developer premium application message, and returns a number of records in response to the applied rules. The first service application creates 538 a response based at least in part on the number of returned records, adds 540 a bill code to the service response, and sends 542 the service response to API platform 432 through API services wrapper 436. In the example embodiment, the bill code may be optional depending on the service setup between the SO and the API platform.

API platform 432 stores 544 a message history of the service response with the bill code. API platform 432 removes 546 the bill code from the service response, and sends 548 the response to developer computer device 404.

The developer application receives 550 the service response, and displays or uses the results.

In the example embodiment, the bill code enables the SO to create a billing report for the developer. The SO requests 560 a billing report from API platform 432 for a specific period of time (monthly, quarterly, yearly), and API platform 432 builds 562 the report based on the bill code. API platform 432 stores the billing report in memory device 422 in a location designated by the SO. The SO is then able to bill the developer for using the SO service application.

FIG. 7 is an exemplary user interface 700 for a production key request. Components shown in FIG. 7 that are identical to components shown in FIGS. 5 and 6 are labeled with the same reference numbers used in FIGS. 5 and 6.

User interface 700 is displayed when developer computer device 404 accesses developer portal 420 and the developer requests a production key. As stated above, process 482 includes a developer requesting 502 premium access including a production key to a particular service application 456 stored on SO computer system 438. The developer request is submitted through developer portal 420, which is accessed via developer computer device 404. Portal 420 displays a user interface, namely user interface 700, that prompts the developer to request a service application 456 offered by the SO via SO computer devices 438. Each developer key alias has a production key or client ID that will be provided in each message, and if that client ID is approved by the SO(s) then developer computer system 404 is able to access the specific service application offered by the SO on SO computer device 438.

User interface 700 includes premium services 702 and general (free) services 704. Each service offered under premium services 702 is listed with a checkbox for selection by the developer. Each service offered under general services 704 is listed with a checkbox for selection by the developer. In addition, user interface 700 includes certificate request file data box 706 which enables a developer to attach to the production key request a CSR (Certificate Signature Request). As explained above, when the developer uploads the CSR, the CSR contains the public key. API platform 432 uses the client ID received with each message and the developer's public key to verify that each message received by API platform 432 has not been tampered with.

FIG. 8 is an exemplary user interface 800 for a premium service request approval displayed for the SO on an SO computer device 438 (shown in FIG. 5). Components shown in FIG. 8 that are identical to components shown in FIGS. 5 and 6 are labeled with the same reference numbers used in FIGS. 5 and 6.

User interface 800 includes a developer and key alias request pull down 802, a name, an address, an email address, a telephone number, a company name, a key alias name, and key alias description. The developer information is submitted to SO computer device 438 for approval. The premium service request approval user interface 800 also includes data fields requiring input from the SO upon receiving the request from the developer. These SO data fields include approve or deny premium access pull-down 804, client ID pull-down 806, throttling amount pull-down 808, throttling time period pull-down 810, and comments section 812. In addition, a billing reports section 814 is included on user interface 800.

In the example embodiment, the API portal include API services documentation pages which include an explanation of service levels between general and multiple premium levels, and the process to obtain premium access. In addition, a developer may be required to register with service provider computer system 402 and provide certain additional information such as a developer pseudo ICA and an acquirer ICA (Interbank Card Association).

The systems and methods described herein also enable a developer to request a sandbox key and create a key alias. The sandbox key is a key that allows a developer to test their applications in a test area within system 402 such that the application being tested is provided test data from system 402 and not real data. A new sandbox key may be granted with access to all existing services with general access.

In the example embodiment, a request for a production key may use a popup with a premium selection for services with premium access. The developer will be prompted to select general access or premium access for each service offered. If premium is selected and there is a general option, then system 402 will grant general access to the developer. In some cases, certain services may only have general access or only have premium access. A production key with a premium access request will still be generated immediately with general access granted if any of the services requested have general access. For example: in the case where a developer requests premium access for ATM locations, the production key will be granted general access until premium access is approved; any message using the production key will be throttled based on general throttling; and messages will be forwarded without a client ID or with a client ID set for general access.

As explained above, when a production key for premium access is requested, an email is sent as notification for the SO to log into an application to approve and manage requests. The email may contain a link to a service management application. The service management application could be part of the API portal or a separate application behind MOL (MasterCard On Line). The email sent to the SO includes, developer name, alias name, and premium access requested. The system may include a configurable time limit to respond to a request by the service with the result of denying access. For example: SO offers a service having a 7 day time limit to respond to a request for premium access. If the request has not been approved or denied in 7 days, it is automatically denied.

The service management application would allow the SO to log in and review pending requests, and then approve or decline premium service access. The SO would have the ability to select a developer and a key alias. After making the developer and alias selection, a screen would display at least the developer name, contact information, alias name, alias description, and premium access requested. The SO would have the ability to approve or deny access, select throttling limits and throttling time limits based from the service setup. The API platform generates a client ID that the service uses to apply rules to messages. The API platform will include the client ID in messages sent to a service from the specified key alias.

The system is also configured to send an email to the developer for notifying the developer as to whether the request has been approved or denied. The system is also configured to allow the SO to view all developers and key alias approval status and transaction metrics by developer and/or by key alias. The system is configured to enable an SO to view, grant and revoke premium access.

The SO provides content for service documentation pages that are accessible through the API portal. The system will also include a list of premium service levels, descriptions, and a designation showing which services require billing reports. The system will provide if a service is general only, premium only, or general and premium. The client ID will be added to messages to allow the service to determine what rules to apply to a message. The system will include a list of pre established bill codes per service that may be returned with each message from the service that identifies the billing level of the transaction. The system will include a list of throttling settings (numbers of requests), and a SO setup page or registration page.

The system, and more specifically the API platform, may be configured to perform throttling by service, service level or production key level (client ID). All service level enforcement functionality will be handled by each service. The API platform will provide the client ID with each message. The API platform validates each message that comes through prior to sending to service. The API platform rejects any unauthorized requests.

In the example embodiment, the system includes a sandbox key to allow a developer to test an application using test data. All general services may be made available to every sandbox key. In addition, the sandbox key may be configured to allow a developer to test premium services and methods once the developer and client ID are approved.

Based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A computer-based method for granting enhanced access to a service application using at least one processor communicatively coupled to at least one memory device, said method comprising:
providing, by the at least one processor, at least one service application having a first access requirement for a first level of access and a second access requirement for a second level of access, the at least one service application associated with a service owner (SO), wherein the first level of access includes access to at least one of data, resources, and functionality provided by the at least one service application, and wherein the second level of access is enhanced access with respect to the first level of access, and wherein the SO assigns rules defining the first access requirement and the second access requirement to the at least one service application;
receiving, by the at least one processor, a request for the second level of access to the at least one service application from at least one of a developer entity and a user of a developer application, the developer application configured to communicate with the at least one service application;
assigning, by the at least one processor, a consumer ID including at least one of a client ID and a production key to the developer application that includes the first level of access to the at least one service application;
requesting the second level of access to the at least one requested service application;
granting the second level of access to the developer application for the at least one requested service application;
updating the consumer ID from having the first level of access to having the second level of access to the at least one service application; and
executing, by the at least one processor, the developer application having the second level of access to the at least one service application, wherein the developer application communicates with the at least one service application based on the second level of access rules assigned by the SO.

2. The method of claim 1, wherein communicating with the at least one service application includes receiving an output from the at least one service application for processing by the developer application.

3. The method of claim 1, wherein the at least one service application is stored within the SP computer system.

4. The method of claim 1, wherein granting enhanced access to a service application stored within a service provider (SP) computer system comprises granting enhanced access to a service application stored within a service provider (SP) computer system through an open application programming interface (API) platform.

5. The method of claim 1, wherein the consumer ID includes a plurality of at least one of a client ID and a production key.

6. The method of claim 5, comprising accessing an open API platform using one of the plurality of production keys.

7. The method of claim 5, comprising accessing a service application using one of the plurality of client IDs.

8. The method of claim 1, wherein receiving a request for the second level of access to the at least one service application comprises receiving a request for the second level of access to the at least one service application by an open API platform.

9. A computer-based method for granting enhanced access to a service application using at least one processor communicatively coupled to at least one memory device, said method comprising:
providing, by the at least one processor, at least one service application having a first access requirement for a first level of access, and a second access requirement for a second level of access, the at least one service application associated with a service owner (SO), wherein the first level of access includes access to at least one of data, resources, and functionality provided by the at least one service application, and wherein the second level of access is enhanced access with respect to the first level of access, and wherein the SO assigns rules defining the first access requirement and the second access requirement to the at least one service application;
receiving a request for access to the at least one service application from at least one of a developer entity and a user of a developer application, the developer application configured to communicate with the at least one service application including receiving an output from the at least one service application for processing by the developer application;
assigning, by the at least one processor, a production key to the developer application that includes the first level of access to the at least one service application and the second level of access to the at least one service application;

executing, by the at least one processor, the developer application having the first level of access to the at least one service application, wherein the developer application communicates with the at least one service application based on the first level of access rules assigned by the SO; and executing, by the at least one processor, the developer application having the second level of access to the at least one service application, wherein the developer application communicates with the at least one service application based on the second level of access rules assigned by the SO.

10. The method of claim 9, wherein communicating with the at least one service application includes receiving an output from the at least one service application for processing by the developer application.

11. The method of claim 9, wherein the at least one service application is stored within a service provider (SP) computer system.

12. The method of claim 9, further comprising granting access to a service application stored within a service provider (SP) computer system stored within a service provider (SP) computer system.

13. The method of claim 12, wherein granting access to a service application stored within a service provider (SP) computer system comprises granting access to a service application through an open application programming interface (API) platform.

14. The method of claim 9, wherein the consumer ID includes a client ID and a production key.

15. The method of claim 9, wherein the consumer ID includes a plurality of at least one of a client ID and a production key.

16. The method of claim 15, comprising accessing an open API platform using one of the plurality of production keys.

17. The method of claim 15, comprising accessing a service application using one of the plurality of client IDs.

18. The method of claim 9, wherein receiving a request for the second level of access to the at least one service application comprises receiving a request for the second level of access to the at least one service application by an open API platform.

19. One or more non-transitory computer-readable storage media having computer-executable instructions embodied thereon, wherein when executed by at least one processor, the computer-executable instructions cause the processor to:

provide at least one service application having a first access requirement for a first level of access and a second access requirement for a second level of access, the at least one service application associated with a service owner (SO), wherein the first level of access includes access to at least one of data, resources, and functionality provided by the at least one service application, and wherein the second level of access is enhanced access with respect to the first level of access, and wherein the SO assigns rules defining the first access requirement and the second access requirement to the at least one service application;

receive a request for the first level of access to the at least one service application from at least one of a developer entity and a user of a developer application, the developer application configured to communicate with the at least one service application;

assign a consumer ID including at least one of a client ID and a production key to the developer application, the consumer ID includes the first level of access to the at least one service application;

request the second level of access to the at least one requested service application;

grant the second level of access to the developer application for the at least one requested service application;

update the consumer ID from having the first level of access to having the second level of access to the at least one service application; and execute the developer application having the second level of access to the at least one service application, wherein the developer application communicates with the at least one service application based on the second level of access rules assigned by the SO.

20. The computer-readable storage media of claim 19, wherein the computer-executable instructions further cause the processor to update at least one of the client ID and the production key to the developer application based on the grant.

* * * * *